(12) United States Patent
Huilgol et al.

(10) Patent No.: US 12,277,432 B2
(45) Date of Patent: Apr. 15, 2025

(54) METHODS AND SYSTEMS FOR USING A PERIPHERAL DEVICE TO ASSIST VIRTUAL MACHINE IO MEMORY ACCESS TRACKING

(71) Applicant: Pensando Systems Inc., Milpitas, CA (US)

(72) Inventors: Chaitanya Huilgol, Bangalore (IN); J. Bradley Smith, San Jose, CA (US); Allen Hubbe, Durham, NC (US); Balakrishnan Raman, Fremont, CA (US); Harinadh Nagulapalli, San Jose, CA (US); Krishna Doddapaneni, Cupertino, CA (US); Murty Subba Rama Chandra Kotha, San Jose, CA (US); Varada Raja Kumar Kari, Bengaluru (IN)

(73) Assignee: Pensando Systems Inc., Milpitas, CA (US)

( * ) Notice: Subject to any disclaimer, the term of this patent is extended or adjusted under 35 U.S.C. 154(b) by 450 days.

(21) Appl. No.: 17/176,130

(22) Filed: Feb. 15, 2021

(65) Prior Publication Data

US 2022/0261266 A1 Aug. 18, 2022

(51) Int. Cl.
*G06F 9/455* (2018.01)
*G06F 9/50* (2006.01)
(Continued)

(52) U.S. Cl.
CPC ........ *G06F 9/45558* (2013.01); *G06F 9/5077* (2013.01); *G06F 12/0882* (2013.01);
(Continued)

(58) Field of Classification Search
CPC ............... G06F 9/45558; G06F 9/5077; G06F 12/0882; G06F 13/105; G06F 13/4221;
(Continued)

(56) References Cited

U.S. PATENT DOCUMENTS 9,436,751 B1 * 9/2016 Serebrin ............. G06F 9/45558
9,875,131 B2 * 1/2018 Tsirkin ................ G06F 9/45545
(Continued)

FOREIGN PATENT DOCUMENTS

WO 2021000689 A1 1/2021

OTHER PUBLICATIONS

Chenbo, Xia et al. "A SUIVey of Live Migration Techniques for SR-IOV Device Pass-through", 2018 IEEE 9th International Conference on Software Engineering and Service Science (ICSESS), Nov. 23, 2018, 4 pgs.
(Continued)

*Primary Examiner* — Michael W Ayers

(57) ABSTRACT

SR-IOV (single root IO virtualization) capable PCIe devices can implement virtual functions (VFs) that are assigned to VMs running on a host machine, thereby speeding IO operation by writing directly to the VMs' memory while bypassing the hypervisor managing the VMs. As such, VFs thwart the dirty page tracking that hypervisors use to minimize VM downtime when the VM is migrated between hosts. The SR-IOV PCIe devices can help resolve this problem by maintaining dirty page tracking data for VMs running on the host machine. The SR-IOV PCIe devices bypassing the hypervisor while writing into a memory page of the VM can set the dirty page tracking data to indicate the memory pages that are dirty (i.e., written to by the VF), and can provide access to the dirty page tracking data. The hypervisor can thereby obtain and use the dirty page tracking data.

17 Claims, 13 Drawing Sheets

(51) Int. Cl.
*G06F 12/0882* (2016.01)
*G06F 13/10* (2006.01)
*G06F 13/42* (2006.01)

(52) U.S. Cl.
CPC ........ *G06F 13/105* (2013.01); *G06F 13/4221* (2013.01); *G06F 9/455* (2013.01); *G06F 2009/4557* (2013.01); *G06F 2009/45579* (2013.01); *G06F 2009/45583* (2013.01); *G06F 2213/0026* (2013.01)

(58) Field of Classification Search
CPC . G06F 2009/45579; G06F 2009/45583; G06F 2213/0026; G06F 2009/4557; G06F 9/455
See application file for complete search history.

(56) References Cited

U.S. PATENT DOCUMENTS

| | | | | |
|---|---|---|---|---|
| 9,898,430 | B2* | 2/2018 | Davda | G06F 13/24 |
| 10,592,271 | B1* | 3/2020 | Sicron | G06F 9/45558 |
| 10,884,790 | B1* | 1/2021 | Saidi | G06F 12/1027 |
| 2013/0132952 | A1* | 5/2013 | Shah | G06F 9/45558 718/1 |
| 2014/0181461 | A1 | 6/2014 | Kegel et al. | |
| 2015/0156124 | A1* | 6/2015 | Tsuji | H04L 47/20 370/230 |
| 2016/0132443 | A1 | 5/2016 | Davda et al. | |
| 2018/0060100 | A1* | 3/2018 | Tsirkin | G06F 9/5088 |
| 2020/0099628 | A1* | 3/2020 | Parikh | H04L 47/6255 |
| 2020/0356493 | A1* | 11/2020 | Mukherjee | G06F 12/1009 |

OTHER PUBLICATIONS

European Search Report, application No. EP 22 15 6323, Jun. 10, 2022, 2 pgs.
Bitchebe, Stella et al. "Intel Page Modification Logging, a hardware virtualization feature: study and improvement for virtual machine working set estimation", Jan. 26, 2020, 14 pgs.
AMD: "Specification Agreement", AMD I/O Virtualization Technology (IOMMU) Specification, 48882—Rev 3.05-PUB—Jan. 2020, 278 pgs.
Kristiansen, Lars Bjørlykke, "PCIe Device Lending, Using Non-Transparent Bridges to Share Devices", Master's Thesis Spring 2015, 96 pgs.
Wikipedia, "Input-output memory management unit", https://en.wikipedia.org/wiki/Input-output_memory_management_unit, retrieved Jan. 21, 2021, 4 pgs.
lwn.net: "Kernel development", retrieved from the internet <URL: https://lwn.net/Articles/347815/>, [retrieved on Feb. 15, 2021], 13 pgs.
Pinchart, Lauren, "Mastering the DMA and IOMMU APIs", Embedded Linux Conference , San Jose, (2014), 102 pgs.

* cited by examiner

700

PCIe Registers for NVMe Devices

| Start | End | Name | Type |
|---|---|---|---|
| 0 | 3Fh | PCI Header | |
| PMCAP | PMCAP+7h | PCI Power Management Capability | PCI Capability |
| MSICAP | MSICAP+9h | Message Signaled Interrupt Capability | PCI Capability |
| MSXICAP | MSIXCAP+Bh | MSI-X Capability | PCI Capability |
| PXCAP | PXCAP+29h | PCI Express Capability | PCI Capability |
| AERCAP | AERCAP+47h | Advanced Error Reporting Capability | PCI Express Extended Capability |

PCIe Header for NVMe Device

| Device ID | | Vendor ID | | 00h |
|---|---|---|---|---|
| Status | | Command | | 04h |
| Class Code | | Revision ID | | 08h |
| BIST | Header Type | Latency Timer | Cache Line Size | 0Ch |
| BAR0 - Memory Register Base Address, lower 32-bits | | | | 10h |
| BAR1 - Memory Register Base Address, upper 32-bits | | | | 14h |
| BAR 2 – Index/Data Pair Register Base Address (I/O Space) or Vendor Specific | | | | 18h |
| BAR 3 (Vendor Specific) | | | | 1Ch |
| BAR 4 (Vendor Specific) | | | | 20h |
| BAR 5 (Vendor Specific) | | | | 24h |
| Cardbus CIS Pointer | | | | 28h |
| Subsystem ID | | Subsystem Vendor ID | | 2Ch |
| Expansion ROM Base Address | | | | 30h |
| Reserved | | Capabilities Pointer | | 34h |
| Reserved | | | | 38h |
| Max Lat. | Min Gnt. | Interrupt Pin | Interrupt Line | 3Ch |

FIG. 8

NVMe Device Registers
Located at PCI BAR0 and BAR1
(Note: All reserved properties and all reserved bits within properties are read-only and return 0h when read.)

| 31   24 23   16 15   8 7   0 | Offset |
|---|---|
| Controller Capabilities | 00h |
|  | 04h |
| Version | 08h |
| INTMS (Reserved) | 0Ch |
| INTMC (Reserved) | 10h |
| Controller Configuration (CC) | 14h |
| Reserved (Reserved) | 18h |
| Controller Status (CSTS) | 1Ch |
| NVM Subsystem Reset (Optional) (NSSR) | 20h |
| Admin Queue Attributes (AQA) (Reserved) | 24h |
| Admin Submission Queue Base Address (ASQ) (Reserved) | 28h |
|  | 2Ch |
| Admin Completion Queue Base Address (ACQ) (Reserved) | 30h |
|  | 34h |
| CMBLOC (Reserved) | 38h |
| CMBSZ (Reserved) | 3Ch |
| Reserved | ⋮ |
|  | EFFh |
| Reserved - Command Set Specific (The property address range from 0h to FFFh is reserved for functionality that is equivalent to the register functionality defined for NVMe over PCIe.) | ⋮ FFFh |
| Reserved - Reserved for Fabrics definition (The property address range from 1000h to 12FFh is reserved for definition by NVMe over Fabrics.) | ⋮ 12FFh |

Extended Capabilities Registers for NVME Single Root I/O Virtualization

| | | | |
|---|---|---|---|
| Next Capability Offset | Capability Version | PCI Express Extended Capability ID | 00h |
| SR-IOV Capabilities ||| 04h |
| SR-IOV Status || SR-IOV Control | 08h |
| TotalVFs (RO) || InitialVFs (RO) | 0Ch |
| RsvdP | Function Dependency Link (RO) | NumVFs (RW) | 10h |
| VF Stride (RO) || First VF Offset (RO) | 14h |
| VF Device ID (RO) || RsvdP | 18h |
| Supported Page Sizes (RO) ||| 1Ch |
| System Page Size (RW) ||| 20h |
| VF BAR0 (RW) ||| 24h |
| VF BAR1 (RW) ||| 28h |
| VF BAR2 (RW) ||| 2Ch |
| VF BAR3 (RW) ||| 30h |
| VF BAR4 (RW) ||| 34h |
| VF BAR5 (RW) ||| 38h |
| VF Migration State Array Offset (RO) ||| 3Ch |

FIG. 10

METHODS AND SYSTEMS FOR USING A PERIPHERAL DEVICE TO ASSIST VIRTUAL MACHINE IO MEMORY ACCESS TRACKING

TECHNICAL FIELD

The embodiments relate to computer networks, network appliances, network switches, network routers, peripheral component interconnect express (PCIe)) cards, singe root input/output virtualization (SR-IOV), virtual machines (VMs), non-volatile memory extended (NVMe) interfaces, and network interface cards (NICs).

BACKGROUND

Modern data centers often have host computers running numerous virtual machines (VMs) that are managed by hypervisors. An aspect of running data centers is migrating a VM from one host to another. A prime goal in migrating a VM is to minimize the VM's down time. However, migrating a VM includes migrating the VM's memory, which can be time consuming when a VM has a large amount of memory. As such, the VM may be out of service for as long as it takes to migrate the VM's memory.

BRIEF SUMMARY OF SOME EXAMPLES

The following presents a summary of one or more aspects of the present disclosure in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented in a method. The method can include maintaining dirty page tracking data for a virtual machine (VM) running on a host machine that uses a hypervisor to manage the VM, bypassing the hypervisor while writing into a memory page of the VM, setting the dirty page tracking data to indicate that the memory page is dirty, and providing access to the dirty page tracking data.

Another aspect of the subject matter described in this disclosure can be implemented by a system that includes a peripheral component interconnect express (PCIe) device. The PCIe device can be configured to be installed in a host machine that has a PCIe bus and uses a hypervisor to manage a virtual machine (VM) running on the host machine, and maintain dirty page tracking data for the VM. The PCIe device can be configured to set the dirty page tracking data to indicate that a memory page of the VM is dirty after a write operation bypasses the hypervisor to write into the memory page via the PCIe bus, and provide access to the dirty page tracking data.

Yet another aspect of the subject matter described in this disclosure can be implemented by a system. The system can include a means for providing a peripheral component interconnect express (PCIe) virtual function (VF) that is used by a virtual machine (VM) running on a host machine that uses a hypervisor to manage the VM. The system can also include a means for the VF to bypass the hypervisor while writing into a memory page of the VM, and a means for informing the hypervisor that the memory page is dirty.

In some implementations of the methods and devices, the dirty page tracking data is set to indicate that the memory page is dirty because a peripheral component interconnect express (PCIe) device wrote into the memory page. In some implementations of the methods and devices, a PCIe device is configured to implement a PCIe function that maintains the dirty page tracking data. In some implementations of the methods and devices, a PCIe function is configured to maintain the dirty page tracking data, and the PCIe function provides access to the dirty page tracking data via a circular buffer.

In some implementations of the methods and devices, a single root IO virtualization (SR-IOV) capable PCIe device implements a virtual function (VF) assigned to the VM, and the dirty page tracking data is set to indicate that the memory page is dirty because the VF wrote into the memory page. In some implementations of the methods and devices, a PCIe function is configured to maintain the dirty page tracking data, the PCIe function uses a circular buffer to provide access to the dirty page tracking data, the PCIe function is configured issue a rate limiting command to the VF, and the VF is configured to limit a memory write rate in response to the rate limiting command.

In some implementations of the methods and devices, a PCIe function is configured to maintain the dirty page tracking data using a bitmap, the PCIe function provides access to the dirty page tracking data via a PCIe bus, and the PCIe function is configured to provide an atomic read and clear operation for reading the bitmap via the PCIe bus. In some implementations of the methods and devices, the dirty page tracking data is maintained in a bitmap, and access to the dirty page tracking data is provided using an atomic read and clear operation. In some implementations of the methods and devices, a network server provides access to the dirty page tracking data. In some implementations of the methods and devices, a PCIe function is configured to maintain the dirty page tracking data, the PCIe function is configured to initiate dirty page tracking for the VM upon receiving a tracking start command, and the PCIe function is configured to stop dirty page tracking for the VM upon receiving a tracking stop command.

In some implementations of the methods and devices, the PCIe device uses single root IO virtualization (SR-IOV) to implement a virtual function (VF) assigned to the VM, and the dirty page tracking data is set to indicate that the memory page is dirty because the VF wrote into the memory page. In some implementations of the methods and devices, the PCIe device implements a PCIe function that maintains the dirty page tracking data, the PCIe function uses a circular buffer to provide access to the dirty page tracking data, the PCIe function is configured issue a rate limiting command to the VF, and the VF is configured to limit a memory write rate in response to the rate limiting command. In some implementations of the methods and devices, the PCIe device implements a PCIe function that maintains the dirty page tracking data, and the PCIe function provides access to the dirty page tracking data via the PCIe bus. In some implementations of the methods and devices, reading the dirty page tracking data via the PCIe bus causes the dirty page tracking data to be cleared. In some implementations of the methods and devices, the system includes a network server that provides access to the dirty page tracking data. In some implementations of the methods and devices, the PCIe device implements a PCIe function that maintains the dirty page tracking data, the PCIe function is configured to initiate dirty page tracking for the VM upon receiving a tracking start command, and the PCIe function is configured to stop dirty page tracking for the VM upon receiving a tracking stop command.

In some implementations of the methods and devices, the system includes a means for throttling the VF based on a state of the means for informing the hypervisor that the memory page is dirty, a means for starting the means for informing the hypervisor that the memory page is dirty, and a means for stopping the means for informing the hypervisor that the memory page is dirty.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIG. 7 is a memory map diagram illustrating a non-limiting example of PCIe registers for a NVMe (non-volatile memory extended) interface according to some aspects.

FIG. 8 is a memory map diagram illustrating a non-limiting example of a PCIe header for an NVMe device according to some aspects.

FIG. 9 illustrates a non-limiting example of NVMe device registers according to some aspects.

FIG. 10 illustrates a non-limiting example of extended capabilities registers for NVMe SR-IOV (single root input/output virtualization) according to some aspects.

Throughout the description, similar reference numbers may be used to identify similar elements.

DETAILED DESCRIPTION

Figure 1:
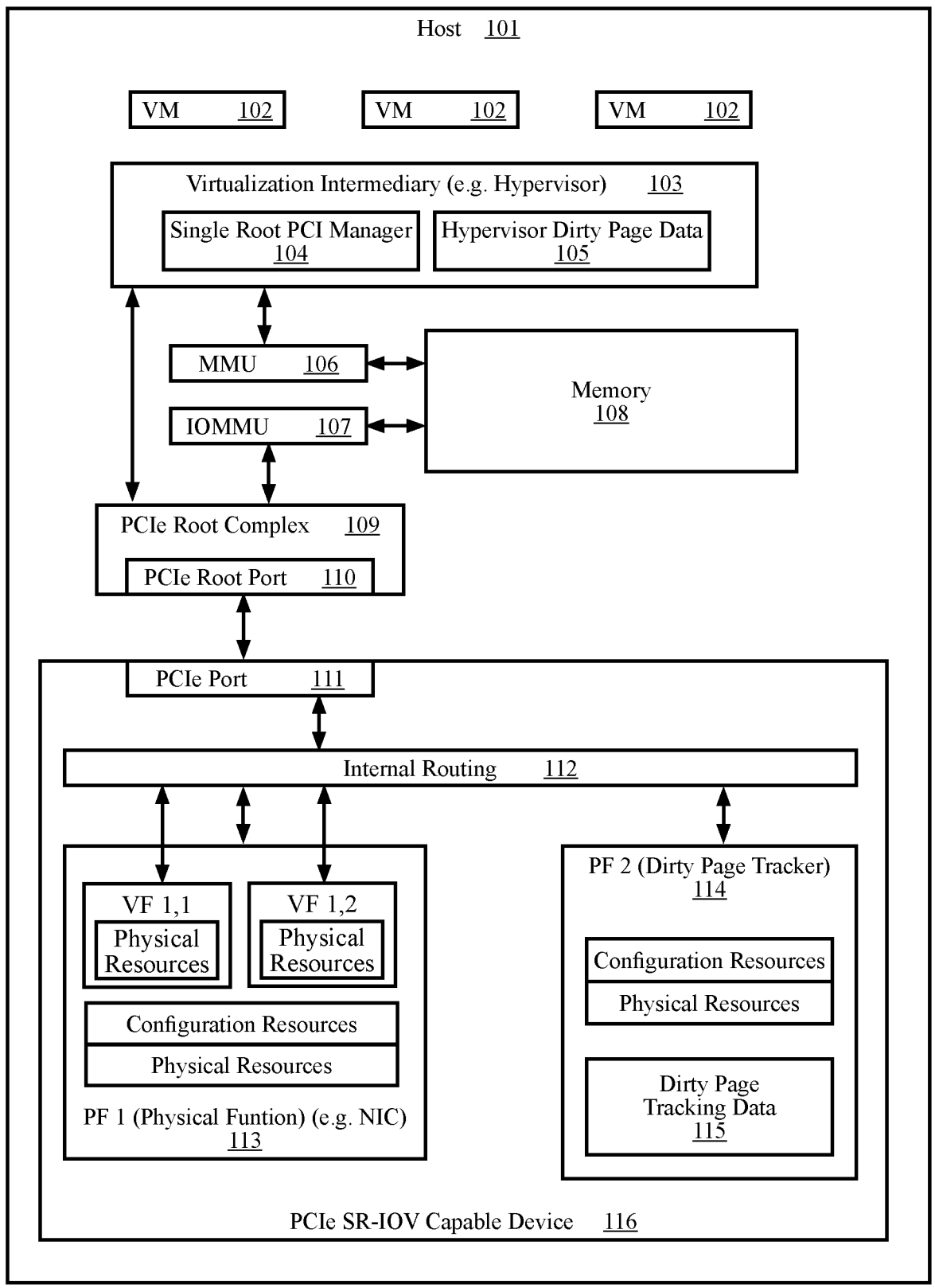
FIG. 1 is a high-level diagram illustrating a PCIe SR-IOV device installed in a host according to some aspects.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The aspects may be embodied in other specific forms without departing from its spirit or essential characteristics. The described embodiments are to be considered in all respects only as illustrative and not restrictive. The scope of the aspects are, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics may be combined in any suitable manner in one or more embodiment. One skilled in the relevant art will recognize, in light of the description herein, that the aspects can be practiced without one or more of the specific features or advantages of a particular embodiment. In other instances, additional features and advantages may be recognized in certain embodiments that may not be present in all embodiments.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

Host computers can use peripheral component interconnect express (PCIe) cards to perform IO operations and to offload tasks from the host's central processing unit (CPU) cores. VM's running on the host may also access the PCIe cards with a hypervisor intermediating the communication. The hypervisor acting as an intermediary can be a bottleneck slowing down the communications. SR-IOV (single root I/O virtualization) is a technology that may remove the bottleneck. PCIe SR-IOV was standardized in "Single Root I/O Virtualization and Sharing Specification Revision 1.1" published by PCI-SIG on Jan. 20, 2010. In accordance with the standard, a SR-IOV capable PCIe card can provide a PF (physical function) and numerous VFs (virtual functions). A host computer having an SR-IOV capable NIC can access the network via the NICs PF while each of the VMs can access the network using a VF that is uniquely associated with the VM. The host may manage the VFs via the PF interface.

An aspect of data center operations is migrating VMs from one host to another. A data center can migrate a VM by halting it on its current host, copying the VM's memory from the current host to the new host, and restarting the VM on the new host. In such a scenario, the VM is down, or out of service, the entire time that its memory is being copied to the new host. In a second scenario, migration time can be decreased by copying the memory without stopping the VM, by tracking the memory pages that change after being copied to the new host (the dirty pages), halting the VM, copying the dirty pages to the new host, and restarting the VM on the new host. In the second scenario the VM only needs to be halted while the dirty pages are copied. In practice, there may be many iterations of updating the new host with dirty pages until the remaining dirty pages can be copied within a predetermined timespan. As such, the VM's downtime can be limited to that predetermined timespan.

An issue that has developed is that the VF in the PCIe SR-IOV device can write into the VM's memory while the hypervisor attempts to track the dirty pages. As discussed above, the VF bypasses the hypervisor while writing to the VM's memory. The hypervisor is therefore unable to track all of the VM's dirty pages. A solution is for the VF to report memory writes to a dirty page tracker that provides access to the dirty page tracking data. For example, a PCIe SR-IOV device can implement the VF assigned to the VM and can also implement a dirty page tracker as a physical function (PF) or as an aspect of an existing PF. When the VM is being prepared for migration, the VF can report memory page writes to the dirty page tracker and the hypervisor can access the dirty page tracker to thereby discover which memory pages were written via operations that bypassed the hypervisor.

An advantage of implementing VFs that report dirty pages to a dirty page tracker is that IO operations can continue to bypass the hypervisor while the VM is being migrated. There is no need to halt the VF or to slow down IO operations via, for example, configuring the hypervisor to interfere with the VF's write operations. Another advantage is that only minor modifications to the hypervisor are required. Specifically, the hypervisor is modified to obtain the dirty page tracking data provided by a PF maintaining that data. As such, a common interface can be used by a variety of devices implementing VFs and reporting dirty pages via a dirty page tracker.

FIG. 1 is a high-level diagram illustrating a PCIe SR-IOV device 116 installed in a host 101 according to some aspects. The host 101 is running three virtual machines (VMs) 102 and a virtualization intermediary 103. For succinctness and without limitation, the virtualization intermediary 103 will herein be referred to as the hypervisor. The hypervisor can contain a single root PCI manager 104 and hypervisor dirty page data 105. The single root PCI manager 104 can manage the assignment of VFs to VMs. An example is that the PCIe SR-IOV capable device 116 can be a network interface card (NIC) that provides a network communications PF to the host 101 and network communications VFs to the VMs. As such, the VFs act as NICs for the VMs. In fact, the VMs may use NIC device drivers as if they were physical machines accessing physical NICs while in reality using VFs implemented by the PCIe SR-IOV capable device 116.

Memory 108 in the host can be random access memory (RAM). The host 101 and the VMs 102 can access the memory 108 via a memory management unit (MMU) that translates addresses in the memory spaces of the host, processes running on the hosts, the VMs, etc. into physical memory addresses in the memory 108. The hypervisor 103 can observe writes operations between the VMs 102 and the memory 108 via the MMU 106. As such, the hypervisor can maintain hypervisor dirty page data 105. A distinction is made herein between the dirty page tracking data and the hypervisor dirty page data 105. The dirty page tracking data is maintained by the dirty page tracker, which is not a process run by the host computer's CPU cores or the hypervisor. The host and the hypervisor may read the dirty page tracking data to thereby learn of pages dirtied by a VF.

The host 101 also has a PCIe root complex 109 that can handle a PCIe root port 110 for communicating with PCIe devices connected to the host 101 via a PCIe bus. PCIe device 116 has a PCIe port 111 connected to the PCIe root port 110 such that the PCI device can communicate to the host 101. Direct memory access (DMA) is a technique often used by IO devices to directly write data to and directly read data from the host's memory 108. The DMA reads and writes can be direct memory operations that do not involve the host's CPU cores, thereby increasing system speed because the CPUs can perform other tasks. The PCI device 116 can access the memory 108 via an IO memory management unit (IOMMU) that is similar to the MMU, but handles IO device DMA operations.

The PCIe SR-IOV devices can implement PFs and VFs for use by the host 101 and the VMs 102. PCIe SR-IOV devices can implement a NIC PF, and NIC VFs. A PCIe SR-IOV device can also implement PF and VFs that provide Non-volatile memory express (NVMe) host controllers, Non-volatile memory express over fabric (NVMe-oF) controllers, InfiniBand channel adapters, graphics processing units (GPUs), machine learning/artificial intelligence CPU offloads, etc. A single PCIe SR-IOV device can implement numerous PFs and VFs of different types such as a NIC, a NVMe-oF controller, and an InfiniBand channel adapter. Each PF and VF may write directly into the host memory 108 via the IOMMU 107.

In FIG. 1, the PCIe SR-IOV capable device 116 is shown implementing two PFs. The first PF 113 can be a NIC PF implementing NIC VFs such as VF 1,1 and VF 1,2. The second PF is a dirty page tracker PF 114 that maintains dirty page tracking data 115. The dirty page tracker 114 can communicate with the first PF 113, VF 1,1, and VF 1,2 via the internal routing 112 of the PCIe SR-IOV device 116. The internal routing 112 also transports data between the PFs, the VFs, and the PCIe port 111.

Figure 2:
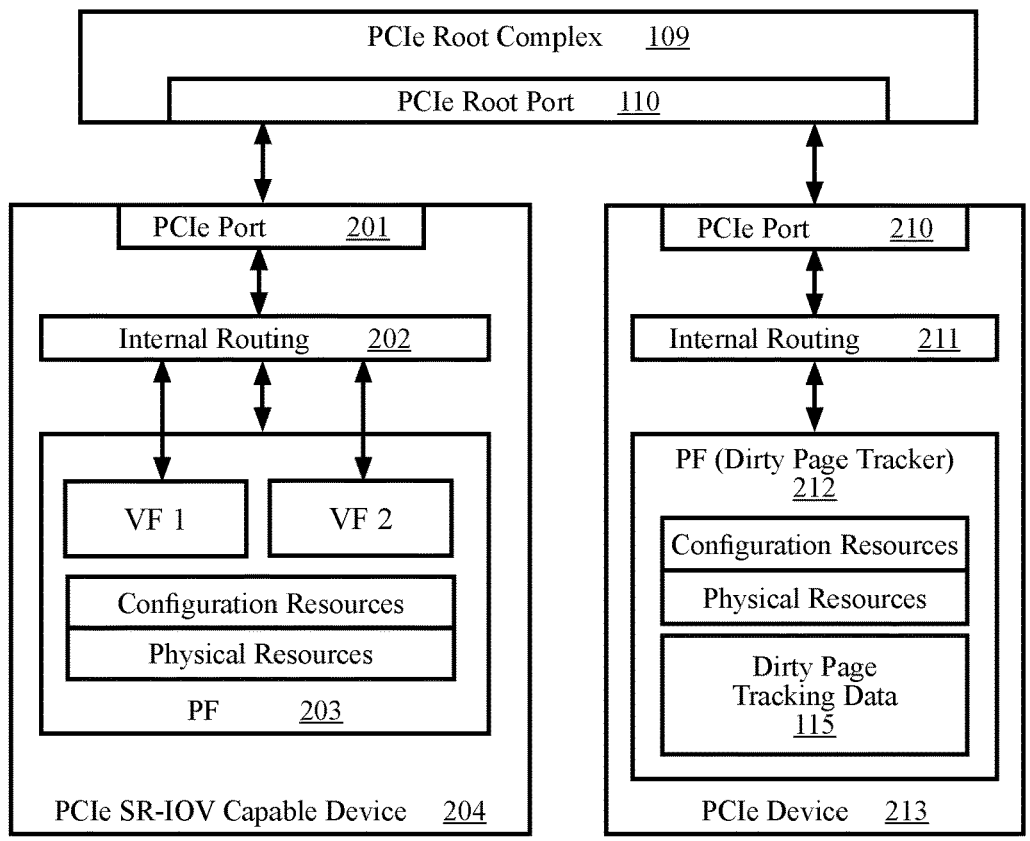
FIG. 2 is a high-level diagram illustrating PCIe devices implementing dirty page tracking according to some aspects.

FIG. 2 is a high-level diagram illustrating PCIe devices 204, 213 implementing dirty page tracking according to some aspects. PCIe SR-IOV device 204 implements a PF 203 and two or more VFs that communicate with the PCIe bus using internal routing 202 and PCIe port 201. PCIe device 213 implements a PF 212 that is a dirty page tracker that maintains dirty page tracking data 115 and communicates with the PCIe bus using internal routing 211 and PCIe port 210. Here, the dirty page tracker 212 communicates with the VFs via the PCIe bus. As indicated by FIG. 2, any PCIe device that can implement a dirty page tracker PF can provide dirty page tracking services for PFs and VFs implemented by other PCIe devices.

Figure 3:
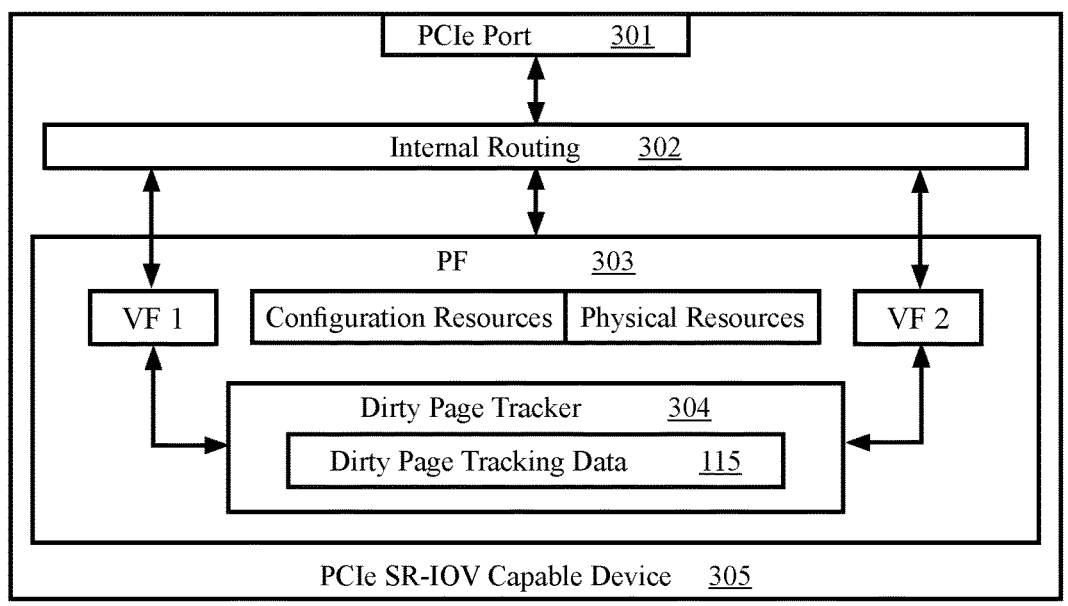
FIG. 3 is a high-level diagram illustrating a PCIe device implementing a physical function, virtual functions, and dirty page tracking according to some aspects.

FIG. 3 is a high-level diagram illustrating a PCIe device 305 implementing a physical function, virtual functions, and dirty page tracking according to some aspects. Here, the PF is an enhanced PF. The PF is enhanced in that it implements a dirty page tracker 304 in addition to its other capabilities. For example, a PCIe SR-IOV NIC card providing NIC VFs can have a NIC PF that is enhanced to also implement a dirty page tracker 304.

Figure 4:
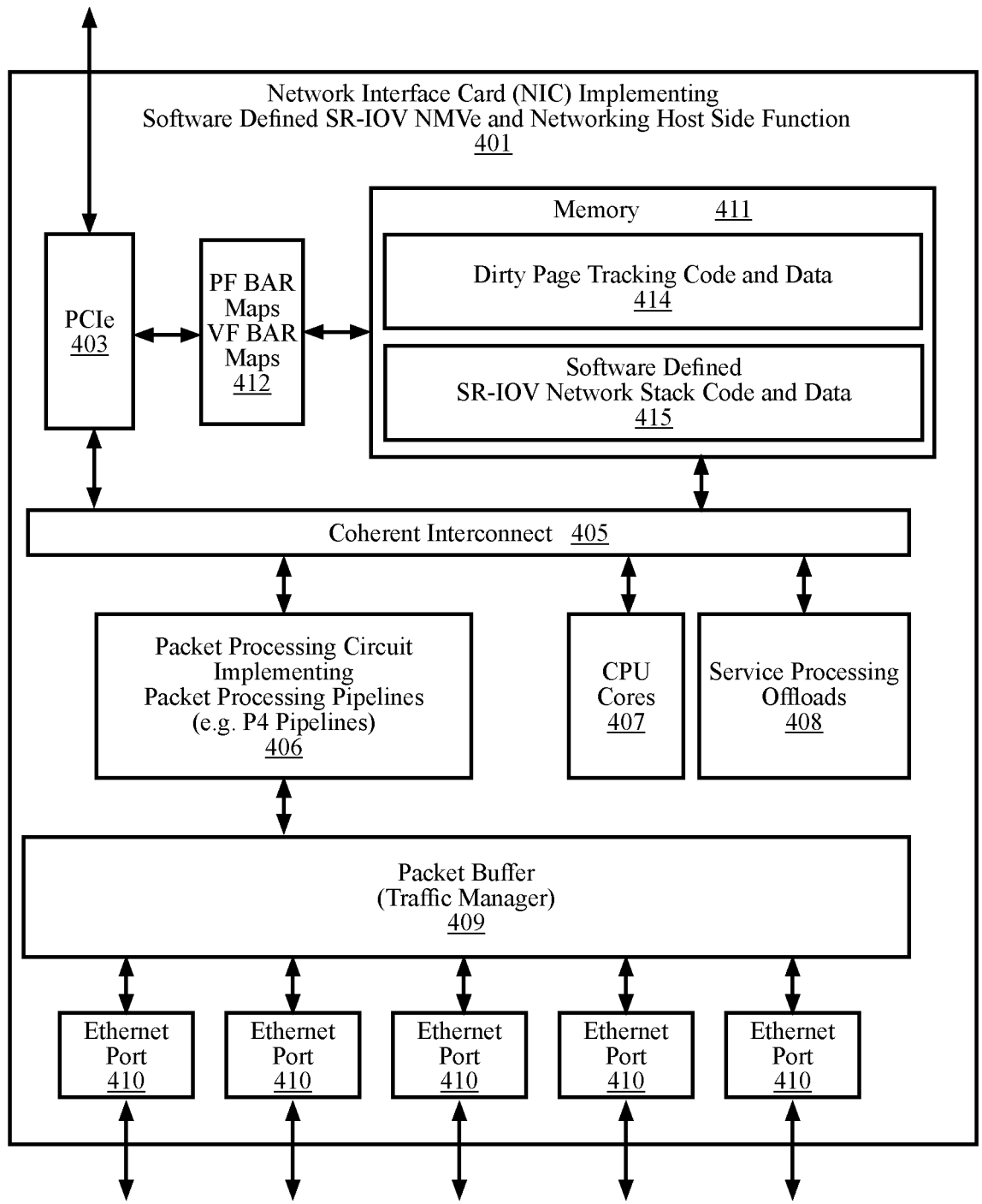
FIG. 4 is a high-level diagram of a network interface card (NIC) configured to implement dirty page tracking according to some aspects.

FIG. 4 is a high-level diagram of a network interface card (NIC) 401 configured as a network appliance according to some aspects. Aspects of the embodiments, including packet processing pipelines, fast data paths, and slow data paths, can be implemented in the NIC 401. The NIC 401 can be configured for operation within a host system. The host system can be a general-purpose computer with a host interface such as a PCIe interface. The NIC 401 can have a PCIe interface 403 through which it can communicate with the host system. The NIC can also include a memory 411, a coherent interconnect 405, a packet processing circuit implementing a packet processing pipeline (e.g., P4 pipelines) 406, CPU cores 407, service processing offloads 408, packet buffer 409, and ethernet ports 410.

The P4 pipelines can be configured for programming via a P4 domain-specific language for programming the data plane of network appliances that is currently defined in the "P416 Language Specification," version 1.2.0, as published by the P4 Language Consortium on Oct. 23, 2019. As such, the P4 pipeline's inputs, outputs, and operations may be constrained such that the P4 pipeline operates in accordance with the P4 language specification.

The NIC 401 can include a memory 411 for running Linux or some other operating system, for storing large data structures such as flow tables and other analytics, and for providing buffering resources for advanced features including TCP termination and proxy, deep packet inspection, storage offloads, and connected FPGA functions. The memory system can include a double data rate synchronous dynamic random-access memory (DDR SDRAM) module. Currently available DDR SDRAM modules include 128 GB DDR5 SDRAM modules. The memory system may include a high bandwidth memory (HBM) module which may support 4 GB capacity, 8 GB capacity, or some other capacity. A HBM may be required for accessing full packets at wire speed. Wire speed refers to the speed at which packets can move through a communications network. For example, each of the ethernet ports can be a 100 Gbps port. Wire speed for the network appliance may therefore be operation at 100 Gbps for each port. HBMs operating at over 1 Tb/s are currently available.

The CPU cores 407 can be general purpose processor cores, such as ARM processor cores, MIPS (Microprocessor without Interlocked Pipeline Stages) processor cores, and/or x86 processor cores, as is known in the field. Each CPU core may include a memory interface, an ALU, a register bank, an instruction fetch unit, and an instruction decoder, which are configured to execute instructions independently of the other CPU cores. The CPU cores can be Reduced Instruction Set Computers (RISC) CPU cores that are programmable using a general-purpose programming language such as C. Each CPU core 407 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache.

Multiple CPU cores 407 may be available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The service processing offloads 408 are specialized hardware modules purposely optimized to handle specific tasks at wire speed, such as cryptographic functions, compression/decompression, etc.

The packet buffer 409 can act as a central on-chip packet switch that delivers packets from the network interfaces 410 to packet processing elements of the data plane and vice-versa. The packet processing elements can include a slow data path implemented in software and a fast data path implemented by packet processing circuitry 406.

The packet processing circuit implementing packet processing pipelines 406 can be a specialized circuit or part of a specialized circuit using one or more ASICs or FPGAs to implement a programmable packet processing pipeline. Some embodiments include ASICs or FPGAs implementing a P4 pipeline as a fast data path within the network appliance. The fast data path is called the fast data path because it processes packets faster than a slow data path that can also be implemented within the NIC. An example of a slow data path is a software implemented data path wherein the CPU cores 407 and memory 411 are configured via software to implement a slow data path. A network appliance having two data paths has a fast data path and a slow data path when one of the data paths processes packets faster than the other data path.

All memory transactions in the NIC 401, including host memory, on board memory, and registers may be connected via a coherent interconnect 405. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing circuit implementing packet processing pipelines 406, CPU cores 407, and PCIe interface 403. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches. The NOC cache may be used to aggregate memory write transactions which may be smaller than the cache line (e.g., size of 64 bytes) of an HBM.

The memory can contain data and executable code and data such as dirty page tracking code and data 414 and software defined SR-IOV network stack code and data 415. The PF BAR maps and VF BAR maps 412 can map PCIe register locations to specific locations within the NIC's memory 411. As such, the host and VMs can write to PCIe "registers" that are actually specified memory locations within the NIC's memory 411. The software defined SR-IOV network stack code is executable code that can be executed by the CPU cores to thereby implement NIC functionality. As such, the NIC PF and the NIC VF's are simply chunks of memory 411 that can be read and written by software defined SR-IOV network stack code. The PF's and VF's can therefore be termed "software defined" because the NIC can instantiate different numbers of PFs and VFs by allocated different amounts of memory 411 as PCIe registers. The NIC 401 can therefore implement one or more NIC PFs and an arbitrary number of NIC VFs.

Above, it was contemplated that the CPU cores 407 execute the dirty page tracking code and software defined SR-IOV network stack code. In practice, the packet processing pipeline 406 can be configured to process IO commands via the PCIe interface. The packet processing pipeline may implement DMA operations to write data directly into the memory space of a VM, a host computer, or a process running on the host computer. In another example, the CPUs can store the IO commands as packets within the packet buffer such that the packet processing pipeline 406 process the commands as it would process other packets received via any other interface or port. As such, the CPUs may implement DMA operations to write data directly into the memory space of a VM, a host computer, or a process running on the host computer.

The memory space of a computer can be organized in memory pages, often simply called pages. The page size is the size of the memory pages. For example, a 1 megabyte memory space may be organized as 8192-byte memory pages. Such a memory space would have 128 pages. Each page in the memory space can be copied into another location to create a snapshot of the memory space. A page becomes dirty when data is written into the page after the page was copied into the snapshot. A dirty page is no longer dirty if it is copied into the snapshot to replace the previous version of the page that was in the snapshot. When all the dirty pages are copied into the snapshot, the snapshot is up to date.

Figure 5:
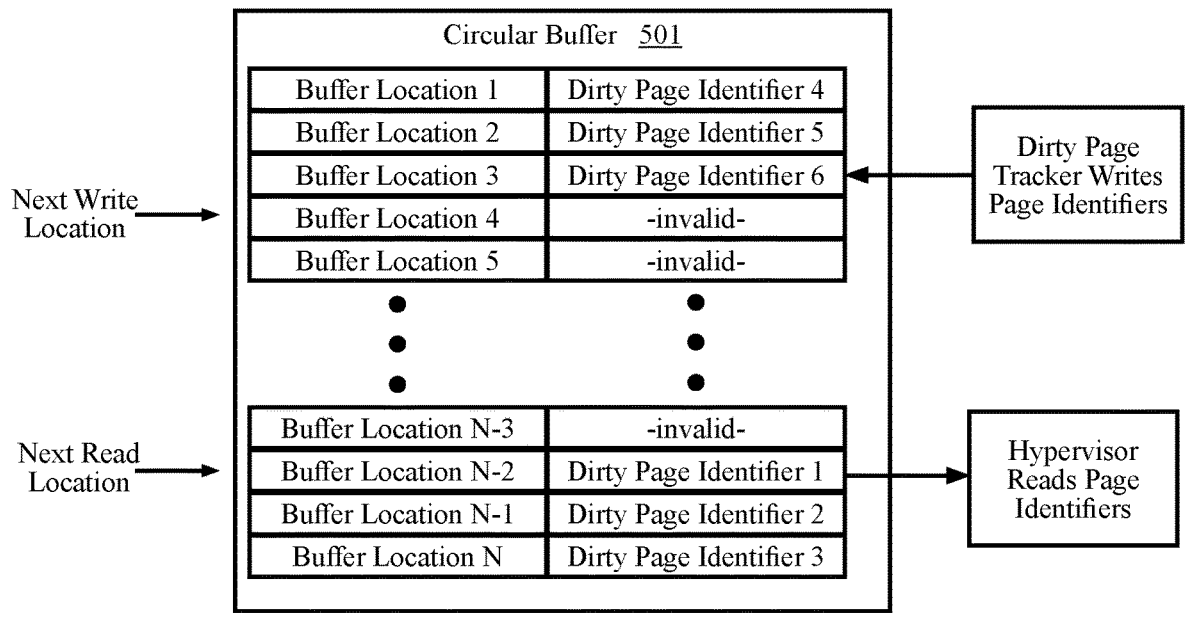
FIG. 5 is a high-level diagram of a circular buffer storing dirty page tracking data according to some aspects.
Figure 6:
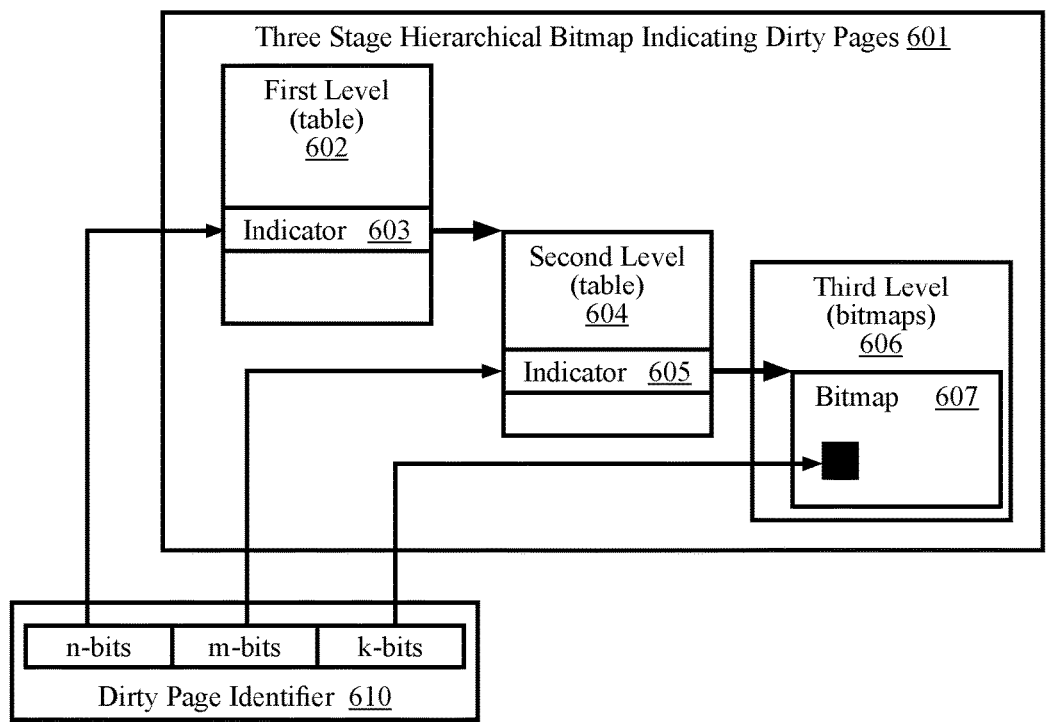
FIG. 6 is a high-level diagram of a hierarchical bitmap storing dirty page tracking data according to some aspects.

FIG. 5 and FIG. 6 illustrate two techniques by which a dirty page tracker can provide access to the dirty page tracking data. The hypervisor may read the dirty page tracking data 115 provided by the dirty page tracker and may supplement the hypervisor dirty page data 105 with the dirty page tracking data 115. As such, the hypervisor completes its knowledge of which memory pages are dirty. Those practiced in the computer programming arts, once familiar with the teachings herein, would know of many other techniques that may alternatively be used for providing access to the dirty page tracking data.

FIG. 5 is a high-level diagram of a circular buffer 501 storing dirty page tracking data according to some aspects. The dirty page tracking data can be dirty page identifiers stored in the circular buffer 501. A dirty page identifier can be an address, a page number, or some other indicator that identifies a memory page. The dirty page tracker can write a dirty page identifier into the next write location of the circular buffer, after which the next write location advances. For example, if the next write location is the third location, then the dirty page identifier is written into the third location and the next write location is advanced to the fourth location. The hypervisor (or another consumer of the data) can read a dirty page identifier from the next read location of the circular buffer, after which the next read location advances. For example, if the next read location is location N-2, then the dirty page identifier is read from location N-2 and the next read location is advanced to location N-1. The location following the Nth location is the first location. The circular buffer is full and should not be written to when the next write location equals the next read location. A flag may be set to indicate "buffer full" when the next write location is set to equal the next read location.

FIG. 6 is a high-level diagram of a hierarchical bitmap 601 storing dirty page tracking data according to some aspects. A bit set to one in a bitmap can indicate a dirty page while a bit set to zero indicates otherwise. Recalling the earlier example with 128 pages each having 8192 bytes, a 128 bit bitmap (non-hierarchical) can indicate that the nth page is dirty by setting the nth bit to one. A memory space can contain millions of pages, in which case a hierarchical bitmap may be more efficient for indicating dirty pages than a non-hierarchical bitmap.

The hierarchical bitmap is illustrated with three levels, although more or fewer levels may be used. The dirty page identifier 610 can be N bits long and can be divided into three sections of length n, m, and k (n+m+k=N). For example, a page in a 1048576 page memory space can use 20-bit page identifiers. A 20-bit page identifier can have three sections with n=8, m=4, and k=8 and can be used for identifying up to 1048576 pages. The first level 602 can be a table having 2n locations (e.g., 28=256). The second level 604 can include tables each having 2m locations (e.g., 24=16). The third level 606 can include bitmaps each having 2k bits (e.g., 28=256). Each entry in the level 1 table can be an indicator 603 identifying a level 2 table. Each entry in the level 2 table can be an indicator 605 indicating a bitmap 607. For example, a level 1 indicator 603 can be the address of a level 2 table. A level 2 indicator can be the address of a bitmap.

A hierarchical bitmap can store dirty page data. To check if a page having a dirty page identifier is a dirty page, the level 1 table entry is checked. If the level 1 table entry is null, then the page is not dirty. Otherwise, the level 1 indicator indicates a level 2 table and the level 2 table entry is checked. If the level 2 table entry is null, then the page is not dirty. Otherwise, the level 2 indicator indicates a bitmap wherein bits set to one indicate dirty pages.

A page can be marked dirty by first checking the level 1 indicator. If the level 1 indicator is null, then a level 2 table is created and the level 1 indicator is set to indicate the newly created level 2 table. Next, the level 2 table can be checked. If the level 2 indicator is null, then a bitmap is created and the level 2 indicator is set to indicate the newly created bitmap. Finally, the appropriate bit is set in the bitmap.

FIGS. 7-10 show standardized register locations and register contents for PCIe devices, NVMe PCIe devices, and SR-IOV capable NVMe-oF PCIe devices. Other types of SR-IOV capable PCIe devices have similarly defined registers. The locations and contents are provided to show that the configuration information and data associated with each PF and each VF are available at locations that are specified by published standards and that data at those locations is in accordance with those published standards. In particular, each PF and VF has a PCIe state as indicated by PCIe resources such as PCIe header location and contents and device registers. Each PF also has a PF state and each VF has a VF state. The PF and VF states include configuration information and data such as IO buffers, queues, device state, connections (for NICS), attachments (for NVMe interfaces), etc.

FIG. 7 is a memory map diagram illustrating a non-limiting example of PCIe register locations for a NVMe interface 700 according to some aspects. The memory map of FIG. 7 is that provided in revision 1.4 of the NVM Express Specification. The NVM Express standards are an open collection of standards developed and maintained by a consortium originally called the NVM Express Work Group that is now incorporated as NVM Express, Inc. The PCIe register locations are relative to a base address. As such, the PCI header is located at the base address. The PCIe header has a specific size and format in accordance with the PCIe specification.

FIG. 8 is a memory map diagram illustrating a non-limiting example of a PCIe header for an NVMe device 800 according to some aspects. FIG. 7 provides a map of register locations whereas FIG. 8 details register contents for an NVMe device. The NVMe PCIe header of FIG. 8 is that provided in revision 1.4 of the NVM Express Specification. Note that the PCIe header for the NVMe device can be for local storage or remote storage. BAR0 and BAR1 can combine to form a 64-bit memory address at which the NVMe device registers are located.

FIG. 9 illustrates a non-limiting example of NVMe device registers 900 according to some aspects. The illustrated NVMe device registers are those specified by "NVM Express over Fabrics, Revision 1.1" published by NVM Express, Inc. on Oct. 22, 2019.

FIG. 10 illustrates a non-limiting example of extended capabilities registers for NVMe SR-IOV 1000 (single root input/output virtualization) according to some aspects. The illustrated PCIe registers are those specified by "Single Root I/O Virtualization and Sharing Specification Revision 1.1" published by PCI-SIG on Jan. 20, 2010. As can be seen, base addresses for the VFs are provided within these particular PCIe extended capabilities registers. In many embodiments, the PFs but none of the VFs have such a set of SR-IOV registers.

The PCIe register contents and register locations may indicate that a PF is a dirty page tracker or is enhanced to include a dirty page tracker. Such an indication may be indicated via the "PCI Express Extended Capability ID", the "SR-IOV Capabilities", a vendor specific register field, etc.

Figure 11:
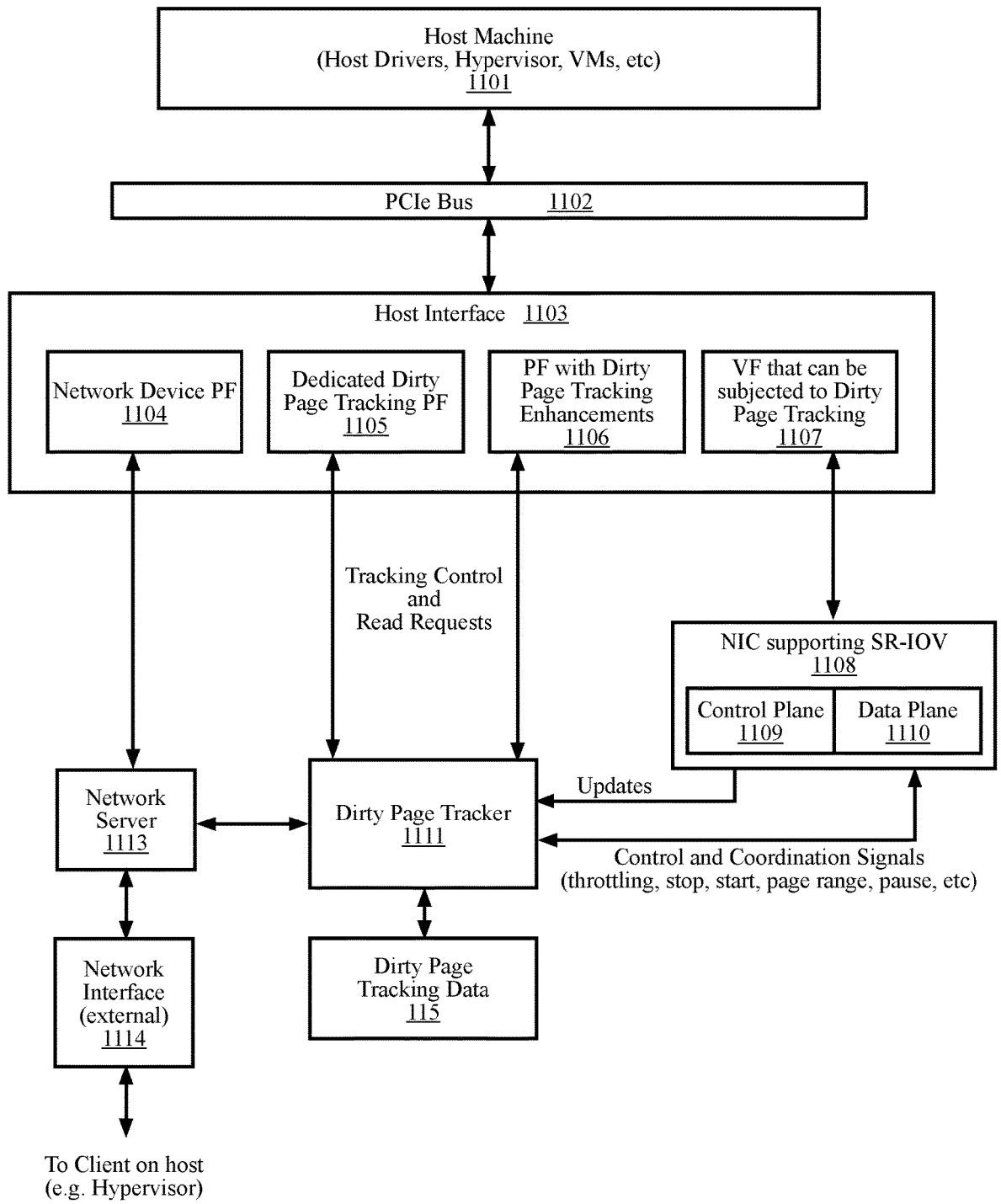
FIG. 11 is a high-level diagram illustrating maintaining dirty page tracking data and providing access to the dirty page tracking data according to some aspects.

FIG. 11 is a high-level diagram illustrating maintaining dirty page tracking data and providing access to the dirty page tracking data according to some aspects. The host machine 1101 can run host drivers, a hypervisor, VMs, and other tasks, code, and processes. The host machine 1101 can interact with a host interface 1103 via a PCIe bus 1102. The host interface 1103 can provide access to a VF 1107 that can be subjected to dirty page tracking. The VF 1107 can be implemented by a NIC 1108 that supports SR-IOV. The NIC can have a control plane 1109 and a data plane 1110. VFs implemented by the NIC 1108 may bypass the hypervisor while writing data into the memory space of a VM.

A dirty page tracker 1111 can be implemented by a PCIe device. The dirty page tracker may be accessed in a number of ways. A PCIe device can implement a PF with dirty page tracking enhancements 1106. For example, the NIC 1108 can implement a NIC PF that is enhanced to access or implement the dirty page tracker 1111. A PCIe device can implement a dedicated PF for dirty page tracking 1105 that can access or implement the dirty page tracker. For example, the NIC 1108 can implement a PF that is dedicated to accessing the dirty page tracker 1111. The dirty page tracker 1111 can be accessed using a network server 1113. The web server may be accessed using an external network interface 1114 or a loopback interface. The web server can be accessed using a network device PF such as a NIC PF implemented by the NIC 1108. The hypervisor may access the dirty page tracker 1111 via the PCIe bus 1102 and a PF such as: the PF with dirty page tracking enhancements 1106; the dedicated dirty page tracking PF 1105; and the network device PF 1104. A host driver (device driver) may be required for the hypervisor, or any other host process, to access the PF with dirty page tracking enhancements 1106 or the dedicated dirty page tracking PF 1105. An existing network stack may suffice for the hypervisor to access the network server 1113. The VFs implemented by the PCIe SR-IOV capable device may interact with the dirty page tracker 1111 to send updates for marking pages as dirty and for exchanging control and coordination signals.

Figure 12:
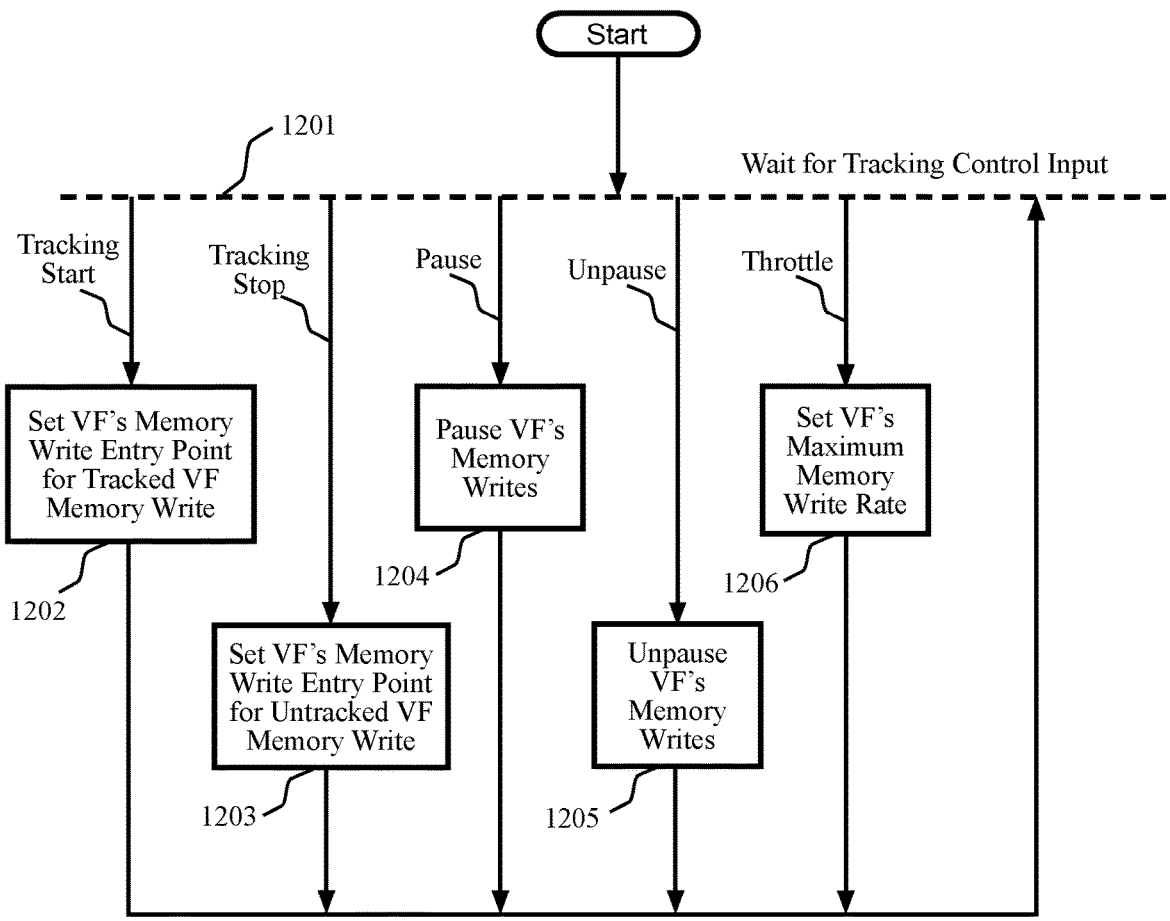
FIG. 12 is a high-level block diagram illustrating a VF receiving control inputs from a dirty page tracker according to some aspects.

FIG. 12 is a high-level block diagram illustrating a VF receiving control inputs from a dirty page tracker according to some aspects. After the start, the VF can wait for a tracking control inputs 1201. This may occur in parallel with other activities performed by the VF. In response to a "Tracking Start" request, the VF may set the VF's memory write entry point for tracked VF memory writes 1202. An entry point can indicate code that a VF executes to perform an operation. A memory write entry point may indicate code that a VF executes to write data into a VM's memory space via an IOMMU, thereby bypassing the hypervisor. In response to a "Tracking Stop" request, the VF may set the VF's memory write entry point for untracked VF memory writes 1203. In response to a "Pause" request, the VF may pause writing into the VM's memory space 1204. In response to an "Unpause" request, the VF may resume writing into the VM's memory space 1205. In response to a "Throttle" request, the VF may set the VF's maximum memory write rate 1206. The throttle request can indicate the maximum memory write rate to use. Indicating a particular rate may indicate that there is no maximum rate (unthrottled operation). An "Unthrottle" command (not illustrated) may indicate that the VF may resume unthrottled operation. In all cases illustrated, the VF resumes waiting 1201 after acting on the request.

Figure 13:
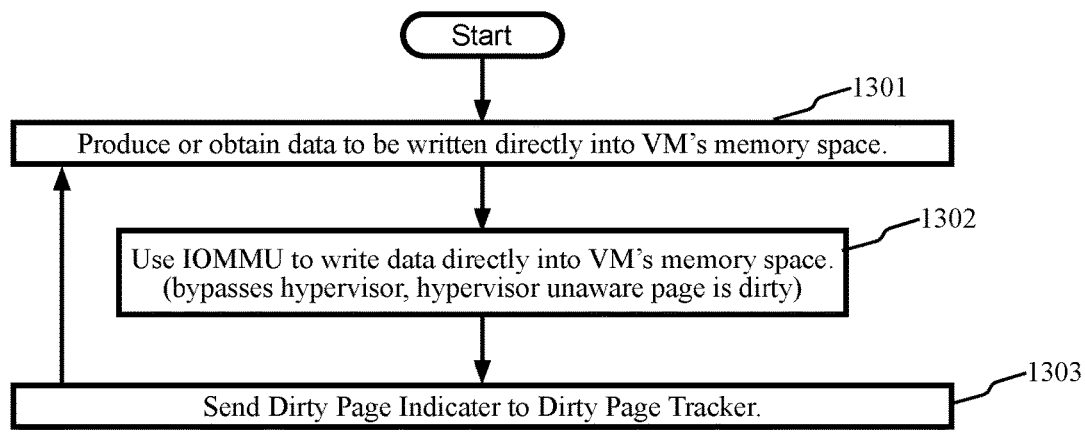
FIG. 13 is a high-level block diagram illustrating a VF storing data in a VMs memory space and sending information to a dirty page tracker according to some aspects.

FIG. 13 is a high-level block diagram illustrating a VF storing data in a VMs memory space and sending information to a dirty page tracker according to some aspects. The process of FIG. 13 may be used after a "Tracking Start" request. After the start, at block 1301 data is produced or obtained that is to be written directly into the VM's memory space. At block 1302, the IOMMU is used to write the data directly into the VMs memory space, thereby bypassing the hypervisor. As such, the hypervisor is unaware that the VF has dirtied a memory page. At block 1303, the VF sends dirty page indicators to the dirty page tracker. The hypervisor may learn about the dirty pages via the dirty page tracker. The process of FIG. 13 is for tracked VF memory writes. A process for untracked VF memory writes can loop back to block 1301 from block 1302 without executing block 1303.

Figure 14:
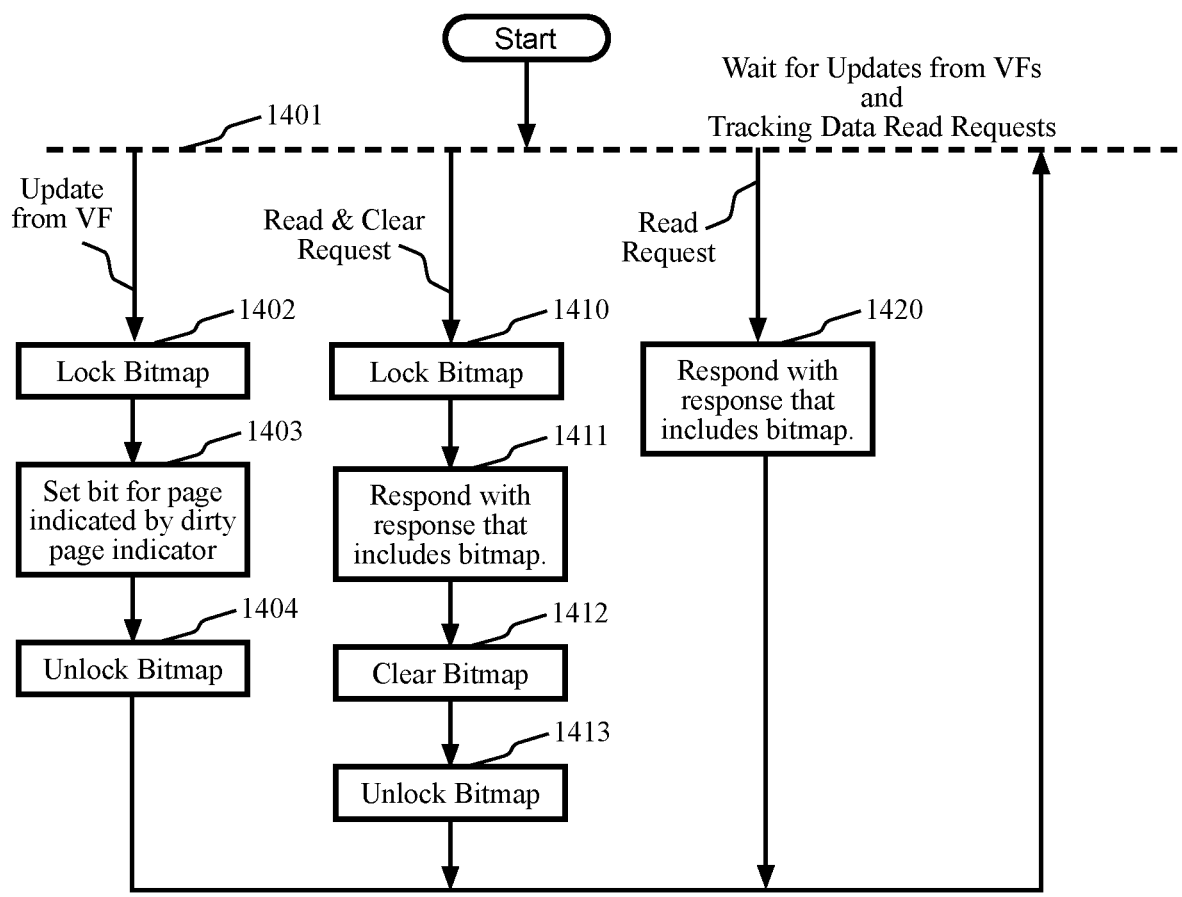
FIG. 14 is a high-level block diagram illustrating a dirty page tracker maintaining dirty page tracking data using a bitmap according to some aspects.

FIG. 14 is a high-level block diagram illustrating a dirty page tracker maintaining dirty page tracking data using a bitmap according to some aspects. After the start, the dirty page tracker waits to input such as updates from the VFs and tracking data read requests 1401. Updates from VFs can include one or more dirty page indicators. Upon receiving an update from a VF, the dirty page tracker locks the bitmap 1402, then sets the bit for the page indicated by the dirty page indicator 1403, and then unlocks the bitmap 1404 before looping back to wait for an input. The hypervisor may be the source of tracking data read requests such as read & clear requests or read requests. When the input is a read & clear request, the dirty page tracker locks the bitmap 1410, then responds with a response that includes the bitmap 1411, clears the bitmap 1412, and finally unlocks the bitmap 1413 before looping back to wait for an input. When the input is a read request, the dirty bit tracker responds with a response that includes the bitmap 1420 before looping back to wait for an input. The update operation and the read & clear operation are implemented as atomic operations. The atomic operations immediately lock the bitmap 1402, 1410 before performing other operations 1403, 1411, 1412. The atomic operations unlock the bitmap 1404, 1413 upon completion of the other operations. The atomic operations ensure that no other process can alter the bitmap after the bitmap is locked and before the bitmap is unlocked.

Figure 15:
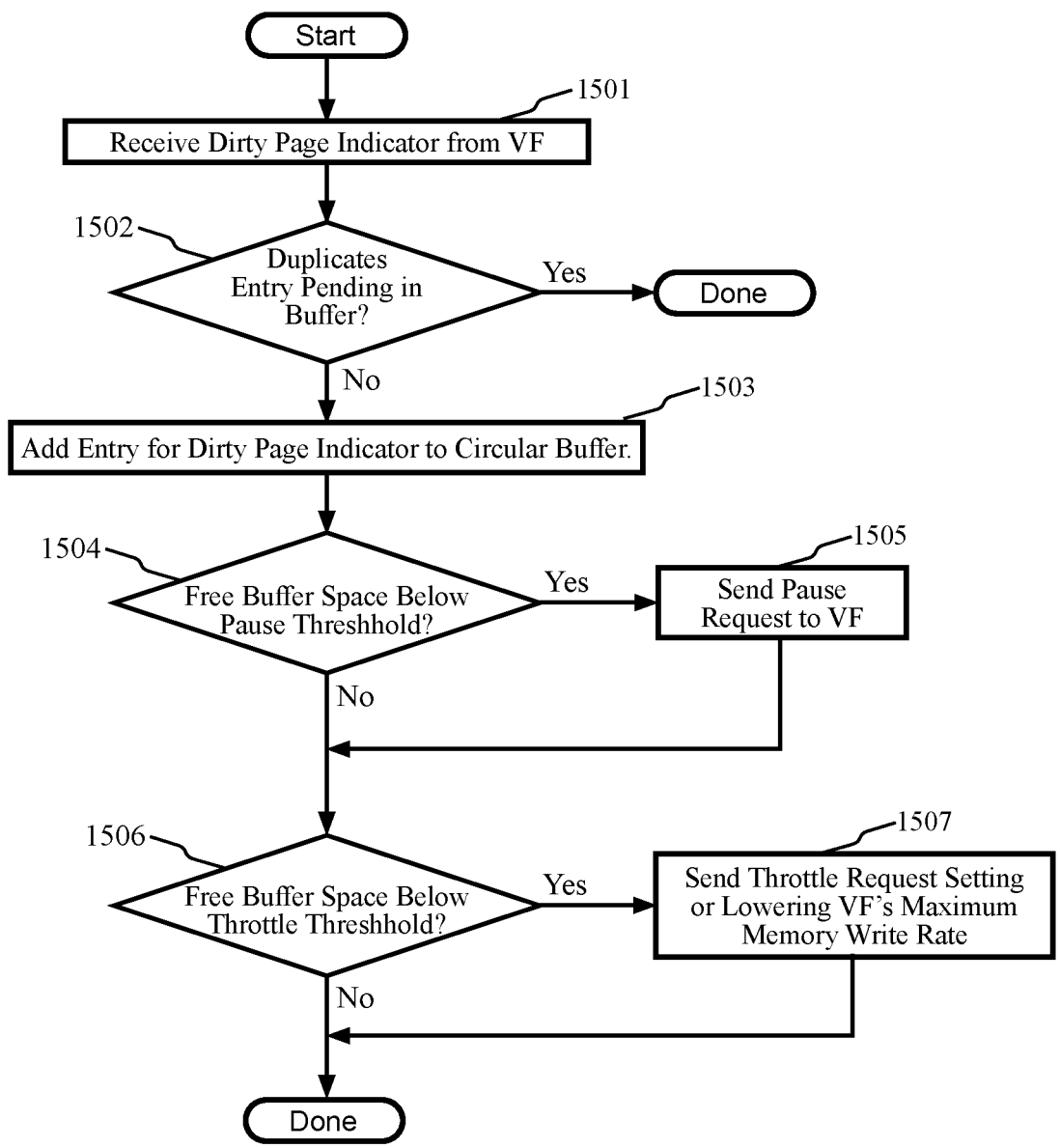
FIG. 15 is a high-level flow diagram illustrating a dirty page tracker receiving dirty page indicators and using a circular buffer according to some aspects.

FIG. 15 is a high-level flow diagram illustrating a dirty page tracker receiving dirty page indicators and using a circular buffer according to some aspects. After the start, at block 1501 the dirty page tracker receives a dirty page indicator from a VF. The dirty page indicator can be received in an update from the VF. At block 1502, the process determines if the dirty page indicator duplicates an entry already pending in the circular buffer. If it is a duplicative, the process is done. Otherwise, at block 1503 an entry for the dirty page indicator is added to the circular buffer. At block 1504, the process determines if the free buffer space is below a pause threshold. If the free space in the circular buffer is below the pause threshold, a pause is sent to the VF 1505 before the process proceeds to block 1506. For example, if there is no free space in the circular buffer then the VF must be requested to pause writing to the VM because no more dirty page updates can be processed by the dirty page indicator. In practice, the pause threshold can be set such that the pause is sent before the circular buffer is completely full (e.g., when only five unused locations remain) because the VF may send more updates before processing a pause request.

At block 1506, the process determines if the free buffer space is below a throttle threshold. If the free space in the circular buffer is below the throttle threshold, a throttle request is sent to the VF 1507 before the process is done. The throttle request can set or lower the VF's maximum memory write rate. Throttling may be used to slow down the number of updates received without causing the VF to completely stop writing to the VMs memory as happens with a pause. As such, the VF may slow down until the hypervisor catches up with its reads of dirty page tracking data from the circular buffer.

Figure 16:
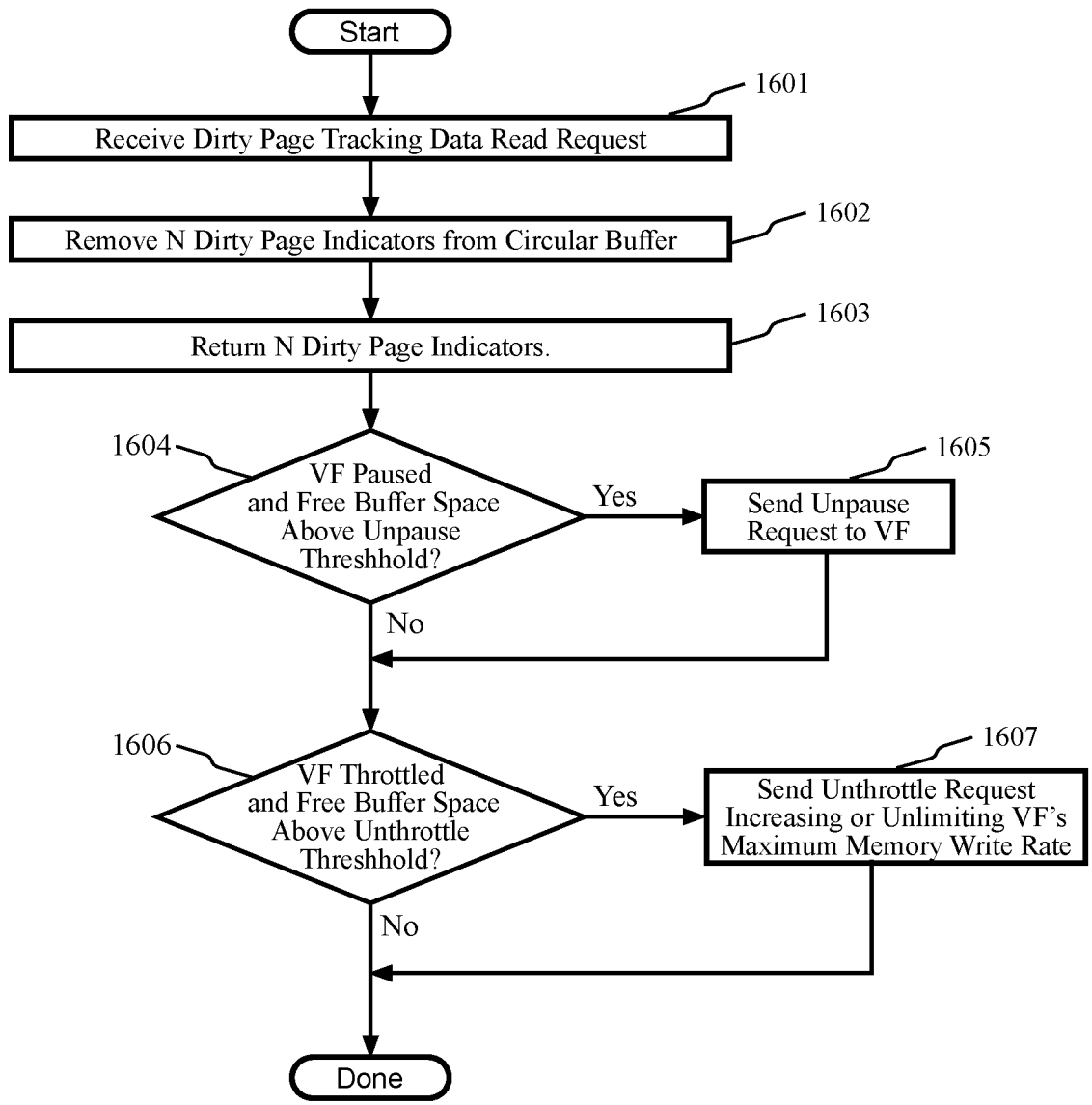
FIG. 16 is a high-level flow diagram illustrating a dirty page tracker using a circular buffer and processing read requests according to some aspects.

FIG. 16 is a high-level flow diagram illustrating a dirty page tracker using a circular buffer and processing read requests according to some aspects. After the start, at block 1601 a dirty page tracking data read request is received. The read request may be for N dirty page indicators or for a single dirty page indicator (N=1). At block 1602, N dirty page indicators are removed from the circular buffer. At block 1603, the N dirty page indicators are returned to the requestor. At block 1604, the process determines if the VF is paused and the free buffer space is above an unpause threshold (may be the same value as the pause threshold). If so, at block 1605 an unpause request is sent to the VF before the process proceeds to block 1606. At block 1606, the process determines if the VF is throttled and the free buffer space is above an unthrottle threshold (may be the same value as the throttle threshold). If so, at block 1607 an unthrottle request is sent to the VF before the process is done. The unthrottle request can increase or unlimit the VF's maximum memory write rate, Circular buffers and bitmaps have been discussed. Techniques such as circular buffers necessitate control operations such as pausing and throttling. Techniques such as bitmaps necessitate atomic operations.

Figure 17:
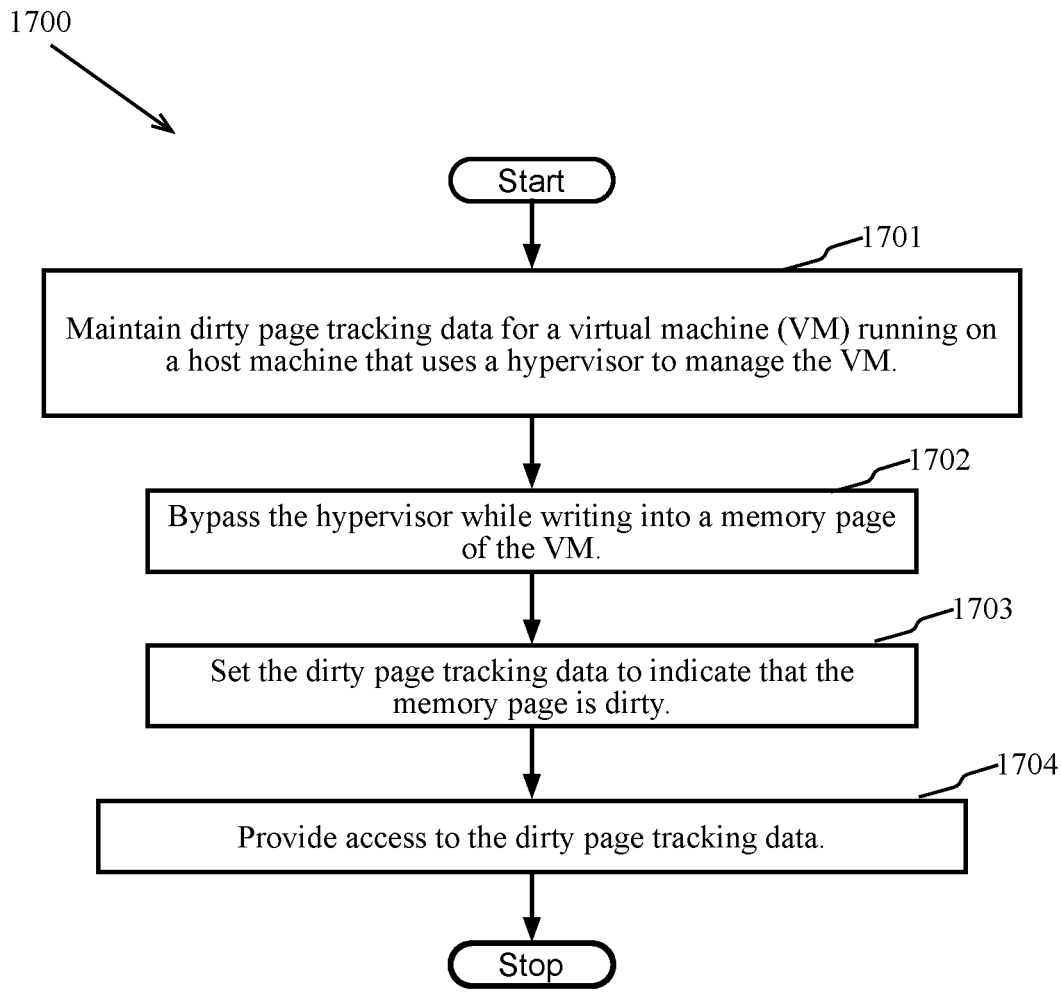
FIG. 17 is a high-level block diagram of a method for using a peripheral device to assist virtual machine IO memory access tracking according to some aspects.

FIG. 17 is a high-level block diagram of a method for using a peripheral device to assist virtual machine IO memory access tracking according to some aspects. After the start, at block 1701 the method maintains dirty page tracking data for a virtual machine (VM) running on a host machine that uses a hypervisor to manage the VM. At block 1702, the method bypasses the hypervisor while writing into a memory page of the VM. At block 1703, the method sets the dirty page tracking data to indicate that the memory page is dirty. At block 1704, the method provides access to the dirty page tracking data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

What is claimed is:

1. A method comprising:
    implementing a first single root IO virtualization (SR-IOV) physical function (PF) that is a network interface card (NIC) PF;
    implementing a second SR-IOV PF that is a dirty page tracker PF;
    using a virtual function (VF) implemented by the NIC PF to bypass a hypervisor that is used to manage a virtual machine (VM) while writing into a memory page of the VM;
    setting dirty page tracking data to indicate that the memory page is dirty in response to the VF writing into the memory page of the VM; and
    providing access to the dirty page tracking data via the dirty page tracker PF.

2. The method of claim 1 wherein the NIC PF is configured to set the dirty page tracking data to indicate that the memory page is dirty in response to the NIC PF writing into the memory page.

3. The method of claim 1 wherein the dirty page tracker PF is configured to provide access to the dirty page tracking data via a circular buffer.

4. The method of claim 1 wherein a peripheral component interface express (PCIe) device is configured to implement the NIC PF and the dirty page tracker PF.

5. The method of claim 4 further including issuing a rate limiting command to the VF, wherein
    the VF is configured to limit a memory write rate in response to the rate limiting command.

6. The method of claim 1 wherein the dirty page tracker PF is configured to maintain the dirty page tracking data using a bitmap and to provide an atomic read and clear operation for reading the bitmap.

7. The method of claim 1 wherein the dirty page tracking data is maintained in a bitmap, and the dirty page tracker PF provides access to the dirty page tracking data using an atomic read and clear operation.

8. The method of claim 4 wherein a network server implemented by the PCIe device provides access to the dirty page tracking data.

9. The method of claim 1 wherein:
the NIC PF is configured to initiate dirty page tracking for the VM in response to receiving a tracking start command; and
the NIC PF is configured to stop dirty page tracking for the VM in response to receiving a tracking stop command.

10. A system comprising:
a peripheral component interconnect express (PCIe) device configured to:
implement a first single root IO virtualization (SR-IOV) physical function (PF) that is a dirty page tracker PF that provides access to dirty page tracking data;
implement a second SR-IOV physical function that is a network interface card (NIC) PF that includes a virtual function (VF) that is configured to bypass a hypervisor while writing into a memory page of a virtual machine (VM) that is managed by the hypervisor; and
set the dirty page tracking data to indicate that the memory page of the VM is dirty in response to the VF bypassing the hypervisor while writing into the memory page.

11. The system of claim 10 wherein:
the dirty page tracker PF is configured for a host driver running on a host machine to access the dirty page tracking data; and
the VF is configured for a VF driver running on the VM to access the VF.

12. The system of claim 11 wherein the VF is configured to limit a memory write rate in response to receiving a rate limiting command from the PF.

13. The system of claim 11 wherein the dirty page tracker PF is configured to clear the dirty page tracking data in response to a read operation that reads the dirty page tracking data.

14. The system of claim 11 further including a network server implemented by the PCIe device that provides access to the dirty page tracking data.

15. The system of claim 11 wherein:
the NIC PF is configured to initiate dirty page tracking for the VM in response to receiving a tracking start command; and
the NIC PF is configured to stop dirty page tracking for the VM in response to receiving a tracking stop command.

16. A system comprising:
a peripheral component interconnect express (PCIe) device configured to:
implement a first single root IO virtualization (SR-IOV) physical function (PF) configured to implement a virtual function means for bypassing a hypervisor while writing into a memory page of a virtual machine (VM) that uses the hypervisor to manage the VM;
implement a means for indicating the memory page is dirty due to the virtual function means bypassing the hypervisor while writing into the memory page; and
implement a second SR-IOV PF configured to implement an access means for providing access to the means for indicating the memory page is dirty.

17. The system of claim 16 further including a means for throttling the virtual function means based on a state of the means for indicating the memory page is dirty.

* * * * *